United States Patent
Batni et al.

(10) Patent No.: US 8,073,128 B2
(45) Date of Patent: Dec. 6, 2011

(54) RINGBACK TONE SERVICE OPT-IN AND OPT-OUT REQUESTS FOR USE BY CALLING PARTY

(75) Inventors: Ramachendra P. Batni, Phoenix, AZ (US); Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 1003 days.

(21) Appl. No.: 11/168,201

(22) Filed: Jun. 28, 2005

(65) Prior Publication Data
US 2007/0003046 A1    Jan. 4, 2007

(51) Int. Cl.
*H04M 3/00* (2006.01)

(52) U.S. Cl. ............... 379/257; 379/207.16; 379/114.13; 379/201.01; 379/911; 455/401

(58) Field of Classification Search ............. 379/202.01, 379/207.16, 257, 114.13, 201.01, 911; 455/401
See application file for complete search history.

(56) References Cited

U.S. PATENT DOCUMENTS

| | | | |
|---|---|---|---|
| 6,654,452 B1* | 11/2003 | Murray et al. | 379/197 |
| 7,136,470 B1* | 11/2006 | Taylor et al. | 379/114.13 |
| 2003/0043989 A1* | 3/2003 | Creamer et al. | 379/211.02 |
| 2004/0120494 A1* | 6/2004 | Jiang et al. | 379/210.01 |
| 2005/0094796 A1* | 5/2005 | Beauford | 379/211.01 |
| 2005/0117726 A1* | 6/2005 | DeMent et al. | 379/142.01 |
| 2006/0023862 A1* | 2/2006 | Sutcliffe | 379/257 |

* cited by examiner

*Primary Examiner* — Ahmad Matar
*Assistant Examiner* — Antim Shah
(74) *Attorney, Agent, or Firm* — Carmen Patti Law Group, LLC (57) ABSTRACT

An opt-out request in one example is received from a calling party to avoid employment of a specialized ringback tone on one or more subsequent calls from the calling party to a called party. A ringback tone call controller determines, based on the opt-out request, to provide a substitute tone to the calling party in place of the specialized ringback tone on the one or more subsequent calls from the calling party to the called party. After receiving the opt-out request on a call, the specialized ringback tone in a further example is stopped for a remainder of a ringing phase of the call. If a ringback tone service state associated with the calling party is an opt-out state, then in one example the calling party makes an opt-in request to allow use of the specialized ringback tone on one or more subsequent calls to the called party.

34 Claims, 3 Drawing Sheets

RINGBACK TONE SERVICE OPT-IN AND OPT-OUT REQUESTS FOR USE BY CALLING PARTY

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"FEEDBACK TO CALLING COMMUNICATION DEVICE ON CALL CONNECTED WITH INTELLIGENT NETWORK SIGNALING," by Ramachendra P. Batni, Robert Brunetti, John B. Reid, Laura Scruggs Reizner, and Michael Joseph Rudolph, application Ser. No. 10/683,969, filed Oct. 10, 2003.

"CHANGE TO PLAYBACK CHARACTERISTIC OF RINGBACK TONE," by Ramachendra P. Batni and Ranjan Sharma, application Ser. No. 11/045,706, filed Jan. 28, 2005.

"RINGBACK TONE BOOKMARK REQUEST BY CALLING PARTY," by Ramachendra P. Batni and Ranjan Sharma, co-filed herewith.

TECHNICAL FIELD

The invention relates generally to communications and more particularly to ringback tone service.

BACKGROUND

Known ringback tone services allow a called party to pre-select a ringback tone to be played to a calling party. Traditionally, the calling party would hear a standard ringback tone before the called party answers the call. The ringback tone service replaces that standard ringback tone with a ringback tone selected by the called party. For example, the ringback tone service allows the called party to customize the ringback tone that the calling party hears during the ringing phase of a call to the called party. The calling party hears the ringback tone preselected by the called party while waiting for the called party to answer.

To set up the ringback tone service, the called party sends ringback tone selection criteria to a ringback tone service component. The ringback tone selection criteria indicate which ringback tone to play in various circumstances. For example, the ringback tone selection criteria may instruct the ringback tone service component to play a first user-selected ringback tone for any call with a first set of characteristics, and to play a second user-selected ringback tone for any call with a second set of characteristics.

In known ringback tone services, the called party is the subscriber of the service. Therefore, the called party selects the ringback tone to be played to the calling party on calls to the called party. The calling party is not able to interact with the ringback tone service that is controlled by the called party. The sound that the calling party hears during the ringing phase of the call can only be changed by the called party. As one shortcoming, the called party may select a ringback tone for the calling party that is disliked by the calling party. As another shortcoming, the calling party must continue to hear the disliked ringback tone on subsequent calls to the called party until the called party changes the selection.

Thus, a need exists for an increase in calling party interaction with a ringback tone service.

SUMMARY

A ringback tone service allows customization of the ringback sound that a calling party hears during the ringing phase of a call to a called party. The ringback tone service allows a called party to input ringback tone selection criteria that indicate which specialized ringback tone to play to the calling party in various circumstances. If the calling party desires not to hear the specialized ringback tone selected by the called party, the calling party may send an opt-out request to the ringback tone service to prevent employment of specialized ringback tones on subsequent calls to the called party. If a ringback tone service state associated with the calling party is an opt-out state, then the calling party can make an opt-in request to allow use of the specialized ringback tones on subsequent calls to the called party.

In one embodiment, there is provided a method for: receiving an opt-out request from a calling party to avoid employment of a specialized ringback tone on one or more subsequent calls from the calling party to a called party; and determining at a ringback tone call controller, based on the opt-out request, to provide a substitute tone to the calling party in place of the specialized ringback tone on the one or more subsequent calls from the calling party to the called party.

In another embodiment, there is provided a method for: accessing a ringback tone subscriber profile of a called party to determine which ringback tone to provide to a calling party on a call to the called party, wherein the called party has pre-provisioned a specialized ringback tone to be played to the calling party on the call; providing the specialized ringback tone to the calling party on the call if the ringback tone subscriber profile indicates that the calling party is in an opt-in state; and providing a standard or default ringback tone to the calling party on the call if the ringback tone subscriber profile indicates that the calling party is in an opt-out state.

In yet another embodiment, there is provided a method for: receiving an opt-in request from a calling party to allow use of a specialized ringback tone on one or more subsequent calls from the calling party to a called party; changing a ringback tone service state associated with the calling party from an opt-out state to an opt-in state based on the opt-in request; and determining at a ringback tone call controller, based on the opt-in state associated with the calling party, to provide the specialized ringback tone to the calling party on the one or more calls from the calling party to the called party.

DESCRIPTION OF THE DRAWINGS

Features of exemplary implementations of the invention will become apparent from the description, the claims, and the accompanying drawings in which:

DETAILED DESCRIPTION

Figure 1:
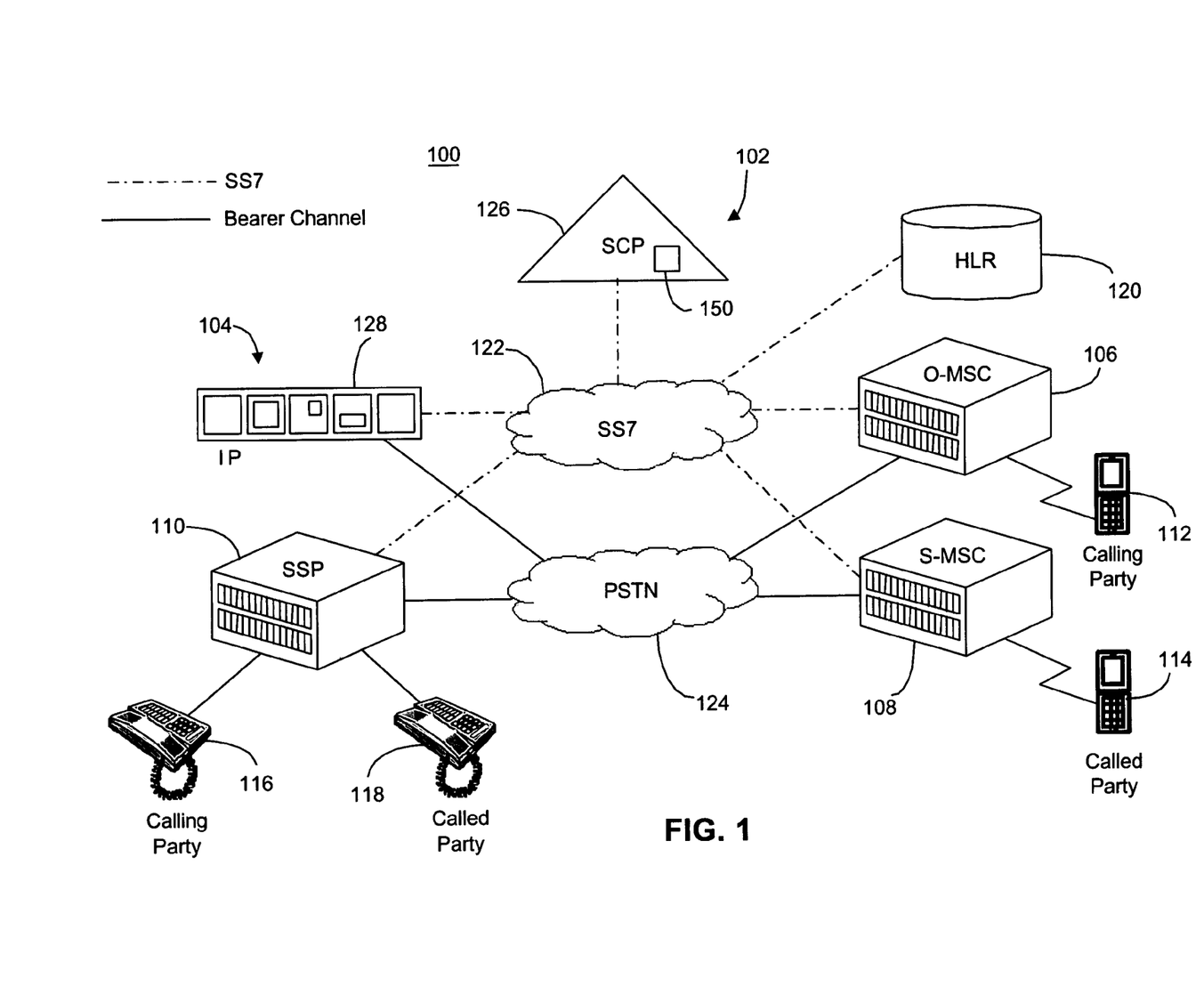
FIG. 1 is a representation of one implementation of an apparatus that comprises one or more intelligent network platforms, one or more mobile switching centers, and one or more service switching points.

Turning to FIG. 1, an apparatus 100 provides a ringback tone service for wireless and/or wire-line telecommunication systems. The apparatus 100 in one embodiment comprises one or more intelligent network ("IN") platforms 102 and 104, one or more mobile switching centers ("MSCs") 106 and 108, and one or more service switching points ("SSPs") 110. The intelligent network platform 102 in one example serves as the ringback tone call controller for the ringback tone service. The intelligent network platform 104 in one example serves as the ringback tone server for the ringback tone service. The MSCs 106 and 108 in one example support wireless communication devices, such as a calling party 112 and a called party 114. The SSP 110 in one example supports wire-line communication devices, such as a calling party 116 and a called party 118. In one example, the apparatus 100 further comprises a home location register ("HLR") 120 associated with the called party 114.

A signaling network 122 communicatively couples the intelligent network platforms 102 and 104, the MSCs 106 and 108, the SSP 110, and the home location register 120. The signaling network 122 in one example comprises a signaling system 7 ("SS7") network that supports signaling traffic. A bearer network 124 communicatively couples the intelligent network platform 104, the MSCs 106 and 108, and the SSP 110. The bearer network 124 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 operate in a wireless intelligent network ("WIN"). In another example, the intelligent network platforms 102 and 104 operate under Customized Applications for Mobile network Enhanced Logic ("CAMEL"). In yet another example, the intelligent network platforms 102 and 104 operate under the wire-line intelligent network standards, such as the ANSI advanced intelligent network ("AIN") and International Telecommunication Union ("ITU-T") Capability Set ("CS") standards (e.g., ITU-T CS-1). Exemplary embodiments of the intelligent network platforms 102 and 104 comprise one or more service control points ("SCPs") 126 and one or more intelligent peripherals ("IPs") 128. The SCP 126 comprises one implementation of a ringback tone call controller. The IP 128 comprises one implementation of a ringback tone server. The SCP 126 comprises an instance of a recordable data storage medium 150, as described herein.

The intelligent network platforms 102 and 104 may be combined into a single intelligent network platform or divided into a plurality of intelligent network platforms. The intelligent network platforms 102 and 104 serve to route calls and play ringback tones to the calling party (e.g., the calling party 112 or 116) on calls from the calling party to the called party (e.g., the called party 114 or 118). For example, the intelligent network platforms 102 and 104 serve to enable a ringback tone service. The intelligent network platforms 102 and 104 allow the called party (e.g., the called party 114 or 118) to preselect a ringback tone to play to the calling party (e.g., the calling party 112 or 116).

In one example, the SCP 126 comprises service logic, American National Standards Institute ("ANSI-41") message handling logic, WIN message handling logic, and an SS7 interface. In another example, the SCP 126 comprises service logic, Global System for Mobile communications ("GSM") message handling logic, and Customized Applications for Mobile network Enhanced Logic message handling logic, and the SS7 interface. In yet another example, the SCP 126 comprises service logic, ANSI-41 message handling logic, ANSI AIN and ITU-T CS logic, and an SS7 interface. The SCP 126 in one example comprises a call controller and a data server. In one example, the call controller and the data server reside on a single SCP. In another example, the call controller and the data server reside on different SCPs. If the call controller and the data server reside on different SCPs, then the call controller queries the data server on the separate SCP for subscriber profile information and to determine what ringback tone to play at the calling party 112. The SCP 126 in one example provides instruction to the IP 128 to control the functionality of the IP 128. For example, the SCP 126 sends messages to the IP 128 to instruct the IP 128 to play the ringback tone to the calling party 112.

The SCP 126 in one example employs one or more of WIN signaling, CAMEL signaling, ANSI advanced intelligent network ("AIN") signaling, session initiation protocol ("SIP") signaling, and International Telecommunication Union ("ITU-T") Capability Set ("CS") signaling, such as ITU-T CS-1 signaling, to route calls that require the ringback tone service to the IP 128. An exemplary employment of WIN signaling is illustrated herein. For example, the SCP 126 receives WIN signaling relating to an incoming call at the MSC 106 for the called party 114. If the incoming call does not require ringback tone service, then the SCP 126 instructs the MSC 106 to provide a standard ringback tone to the calling party 112. If the incoming call requires ringback tone service, then the SCP 126 sets parameters in WIN signaling messages to direct the incoming call to the IP 128. Therefore, the IP 128 can play the specialized or substitute ringback tone to the calling party 112. For example, the SCP 126 directs the associated switch 106, 108, or 110 (depending on which called party was called and what ringback tone service method is deployed) to route the incoming call to the IP 128, so the IP 128 may play the specialized or substitute ringback tone at the calling party 112 prior to connection of the call with the called party 114. In one example, the IP 128 stores the available ringback tones. In another example, the IP 128 accesses a storage component that stores the available ringback tones.

To route the incoming call to the IP 128, the SCP 126 in one example sets a TerminationList parameter of a WIN signaling message to a directory number of the IP 128. Then, the SCP 126 sends the TerminationList parameter in the WIN signaling message to the MSC 106 that queried the SCP 126 on what action to take for the incoming call. Upon receipt of the WIN signaling message, the MSC 106 connects the call to the IP 128. If the called party comprises the wire-line called party 118, then the SSP 110 sends a query to the SCP 126 to obtain information on how to treat the incoming call.

The intelligent network platforms 102 and 104 in one example employ WIN signaling, Integrated Services Digital Network User Part ("ISUP") signaling, and ANSI signaling to enable the ringback tone service. The WIN signaling, ISUP signaling, and ANSI signaling are in accordance with ANSI standards. In one exemplary implementation, the signaling messages follow one or more of ANSI/TIA/EIA-41-D, TIA/EIA/IS-771, and TIA/EIA/IS-826 standards, in addition to ANSI ISUP standards for the bearer connection.

The SCP 126 in one example serves as the ringback tone call controller for the ringback tone service. For example, the SCP 126 determines whether an incoming call will receive a specialized ringback tone or a substitute ringback tone. The specialized ringback tone in one example comprises a ringback tone selected by the called party 114 for calls from the calling party 112. For example, the specialized ringback tone may be a song or a recorded message. After hearing the specialized ringback tone selected by the called party 114, the calling party 112 may dislike the specialized ringback tone and may prefer to hear a more standard ringback tone. The substitute tone in one example comprises the standard ringback tone that the calling party is familiar with hearing during the ringing phase of calls. If the calling party 112 dislikes the selected specialized ringback tone, then the calling party 112 may send an opt-out request and receive a substitute tone in place of the specialized ringback tone. If the calling party 112 has elected the substitute tone in place of the specialized ringback tone for subsequent calls to the called party 114, the SCP 126 will route the subsequent calls to either a switch on the call or the IP 128 to play the substitute tone, such as the standard ringback tone. If the calling party 112 has not elected the substitute tone in place of the specialized ringback tone, the SCP 126 will route the subsequent calls to the IP 128 to play the specialized ringback tone. The IP 128 in one example comprises the ringback tone server that plays the ringback tones for the ringback tone service.

The SCP 126 employs a ringback tone subscriber profile of the called party 114 to determine which tone to provide to the calling party 112. The ringback tone subscriber profile of the called party 114 in one example comprises an entry for the calling party 112 that indicates which specialized ringback tone has been preselected by the called party 114 to be played to the calling party 112 on calls from the calling party 112 to the called party 114. The entry for the calling party 112 in the ringback tone subscriber profile of the called party 114 also indicates whether the calling party 112 is in an opt-in state or an opt-out state for the ringback tone service.

The entry for the calling party 112 in the ringback tone subscriber profile of the called party 114 in one example is initially provisioned to be in the opt-in state or an opt-out state for the ringback tone service. In one example, the called party 114 sets the initial ringback tone service state for the calling party 112 when the called party 114 selects the specialized ringback tone for calls from the calling party 112. In another example, the called party 114 employs a post-call interface to initially set or modify the ringback tone service state of the calling party 112. For example, the called party 114 may set or modify the ringback tone service state of the calling party 112 via a short message, the Internet, interactive voice response system, or wireless application protocol menu. In another example, the SCP 126 sets the ringback tone service state for the calling party 112 to a certain default value (e.g., opt-in) when the called party 114 selects the specialized ringback tone for calls from the calling party 112.

The calling party 112 also can change the ringback tone service state of the calling party 112 in the ringback tone subscriber profile of the called party 114. The calling party 112 sets the opt-in or opt-out state by sending opt-in or opt-out requests. The opt-in request sets the ringback tone service state to the opt-in state. The opt-out request sets the ringback tone service state to the opt-out state. If the ringback tone service state is already in the opt-out state, then the opt-out request will not modify the current ringback tone service state. If the ringback tone service state is already in the opt-in state, then the opt-in request will not modify the current ringback tone service state.

In one example, the calling party 112 inputs the opt-in or opt-out requests during the ringing phase of a call. In another example, the calling party 112 employs a post-call interface to enter the opt-in or opt-out requests. For example, the calling party 112 may send the opt-in and opt-out requests via a short message, the Internet, interactive voice response system, or wireless application protocol menu. The calling party in one example employs the post-call interface to send an opt-out request to be applied for subsequent calls to the called party 114. The post-call interface then transmits the opt-out request to the SCP 126 which employs the opt-out request to set the calling party 112 to an opt-out state in the ringback tone subscriber profile of the called party 114.

If the calling party 112 is in the opt-in state and the incoming call otherwise qualifies for the specialized ringback tone (e.g., characteristics of the incoming call match the ringback tone selection criteria set up by the called party 114), then the SCP 126 will provide the specialized ringback tone to the calling party 112. If the calling party 112 is in the opt-out state, then the SCP 126 will provide the substitute tone to the calling party 112. In one example, the substitute tone comprises the standard ringback tone. In another example, the substitute tone comprises a default ringback tone played by the IP 128.

In one example, the subscriber of the ringback tone service comprises a wireless communication device, such as the called party 114. Upon receipt of an incoming call for the called party 114 at the MSC 106, the SCP 126 receives signaling relating to the incoming call from the MSC 106. The MSCs 106 and 108 support mobile telecommunication devices, for example, the calling party 112 and the called party 114. The MSCs 106 and 108 in one example comprise an originating mobile switching center ("O-MSC") 106 for the called party 114 and a serving mobile switching center ("S-MSC") 108 for the called party 114. For example, the O-MSC 106 supports a home area of the called party 114 and the S-MSC 108 supports the called party 114 if the called party 114 moves to a roaming area. If the called party 114 is within the home area supported by the O-MSC 106, then the S-MSC 108 may not be in the call path between the calling party 112 and the called party 114. For example, the O-MSC 106 would also serve as a S-MSC for the called party 114. The calling party 112 in one example is supported by the O-MSC of the called party 114 (as shown in FIG. 1). The calling party 112 in another example is supported by a different MSC (not shown) and a call from the calling party 112 to the called party 114 will pass from the calling party 112 to the other MSC, then through the bearer network 132, and to the O-MSC 106 of the called party 114 to locate the called party 114 for the call.

In another example, the subscriber of the ringback tone service comprises a wire-line communication device, such as the called party 118. Upon receipt of an incoming call for the called party 118 at the SSP 110, the SCP 126 receives signaling relating to the incoming call from the SSP 110. The SSP 110 supports wire-line telecommunication devices, for example, the calling party 116 and the called party 118. The SSP 110 is the service switching point for the called party 118. The calling party 116 in one example is supported by the SSP of the called party 118 (as shown in FIG. 1). The calling party 116 in another example is supported by a different SSP (not shown) and a call from the calling party 116 to the called party 118 will pass from the calling party 116 to the other SSP, then through the bearer network 132, and to the SSP 110 of the called party 118.

Figure 2:
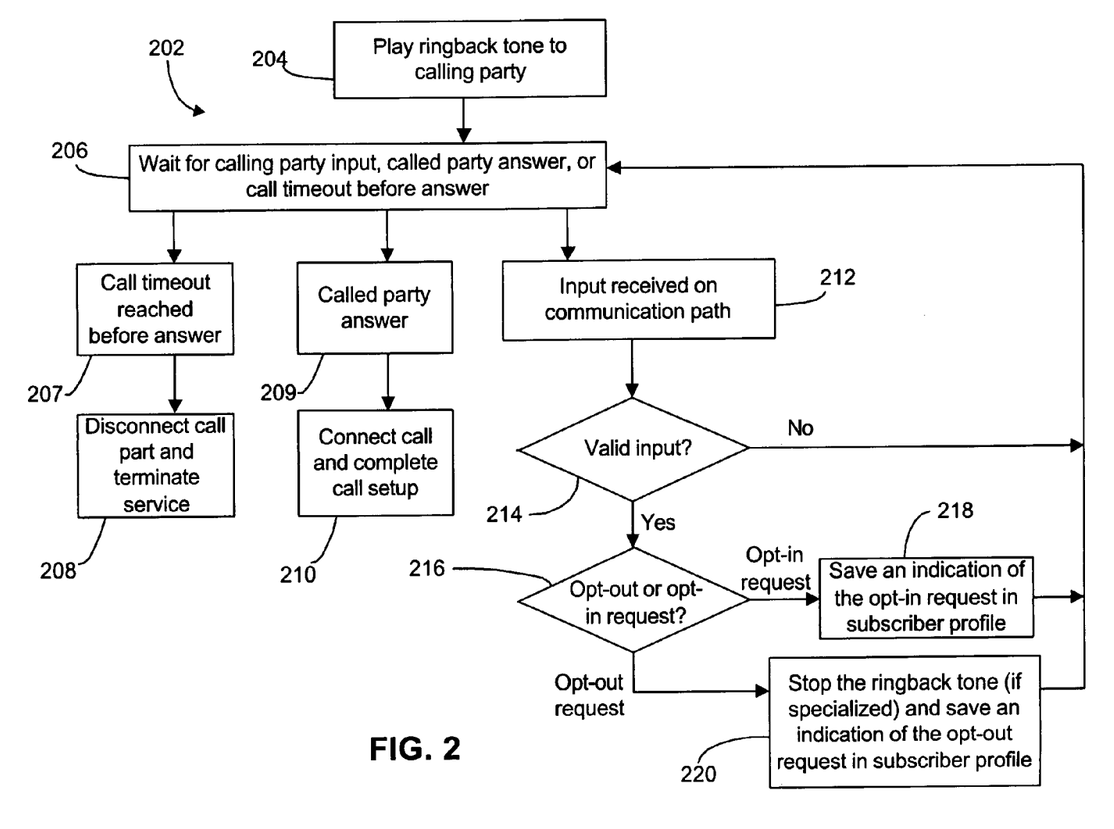
FIG. 2 is a representation of one exemplary logic flow that illustrates an opt-in or opt-out request by a calling party to either accept specialized ringback tones or avoid employment of specialized ringback tones on one or more subsequent calls from the calling party to the called party.

Referring to FIGS. 1-2, an illustrative description of one exemplary operation of the apparatus 100 is presented, for explanatory purposes. Exemplary logic 202 serves to illustrate an opt-in or opt-out request by a calling party (e.g., the calling party 112 or 116) to either accept specialized ringback tones or avoid employment of specialized ringback tones on one or more subsequent calls from the calling party to the called party (e.g., the called party 114 or 118). An exemplary implementation is described herein using the wireless communication devices (e.g., the calling party 112 and the called party 114). The logic 202 employs one or more steps, for example, STEPS 204, 206, 207, 208, 209, 210, 212, 214, 216, 218, and 220.

At STEP 204, a ringback tone is played to the calling party 112 during the ringing phase of a call to the called party 114. In one example, the IP 128 is playing a specialized ringback tone (e.g., a ringback tone preselected by the called party 114) to the calling party 112. In another example, the IP 128 is playing a substitute tone (e.g., the standard ringback tone) to the calling party 112.

At STEP 206, a listening device monitors the bearer path connected with the calling party 112 to listen for input from the calling party 112. The listening device in one example detects a voice command or a Dual-Tone Multi-Frequency ("DTMF") tone sent by the calling party 112. For example, the calling party 112 may input a voice command or DTMF tone to serve as an opt-in or opt-out request. At STEP 206, the calling party 112 may make an input, the called party 114 may answer the call, or a call timeout may be reached before the call is answered.

If the call timeout is reached at STEP 206, then STEP 206 proceeds to STEP 207. At STEP 207, the timeout is reached before the called party 114 answers the call and STEP 207 proceeds to STEP 208. At STEP 208, the call is disconnected and the ringback tone service is terminated.

If the called party 114 answers the call at STEP 206, then STEP 206 proceeds to STEP 209. At STEP 209, the called party 114 in one example accepts the incoming call from the calling party 112 and STEP 209 proceeds to STEP 210. At STEP 210, the call is connected between the calling party 112 and the called party 114 and call setup is completed.

If the calling party 112 makes an input at STEP 206, then STEP 206 proceeds to STEP 212. At STEP 212, the listening device receives the input from the calling party 112. For example, the listening device receives a voice command or DTMF tone. Where the input comprises a DTMF tone, the listening device passes the DTMF tone to the IP 128 or the SCP 126, and STEP 212 proceeds to STEP 214. Where the input comprises a voice command, the listening device employs a speech recognition port and a grammar compiler to detect a speech input and assign probability scores to the speech input. The probability scores in one example indicate the percentage chances that the speech input corresponds to various valid inputs. For example, after the calling party 112 inputs the voice command "opt out," the grammar compiler may assign a 99% chance that the speech input corresponds to an opt-out request and a 1% chance that the speech input corresponds to an opt-in request. The listening device then passes the probability scores tone to the IP 128 or the SCP 126, and STEP 212 proceeds to STEP 214.

At STEP 214, the IP 128 or the SCP 126 determines whether the input is valid. The input is valid if the received voice command or DTMF tone corresponds to an allowable action for the ringback tone service to take. For example, inputs that correspond to an opt-in request or an opt-out request are valid. If the input is invalid, then STEP 214 proceeds back to STEP 206 to continue monitoring the communication path for more input from the calling party 112 or for the called party 114 to answer the call. If the input is valid, the STEP 214 proceeds to STEP 216.

At STEP 216, the listening device, IP 128, or SCP 126 determines whether the received input corresponds to an opt-in request or an opt-out request. Where the received input comprises a DTMF tone, the IP 128 or SCP 126 receives the DTMF tone from the listening device and decides whether the an opt-in request or an opt-out request was made. Where the received input comprises a voice command, the IP 128 or SCP 126 receives the probability scores from the listening device and decides whether an opt-in request or an opt-out request was made. If the IP 128 makes the determination of whether the received input corresponds to an opt-in request or an opt-out request, then the IP 128 passes an indication of the opt-in request or the opt-out request to the SCP 126. If the SCP 126 makes the determination of whether the received input corresponds to an opt-in request or an opt-out request and the IP 128 needs to take an action based on the input, then the SCP 126 passes an indication of the opt-in request or the opt-out request to the IP 128.

In one example, the voice command "opt-in" and the DTMF tone "1" correspond to the opt-in request, and the voice command "opt-out" and the DTMF tone "2" correspond to the opt-out request. If the listening device receives the voice command "opt-in" or the DTMF tone "1" during the ringing phase of the call, then the listening device, IP 128, or SCP 126 determines that the calling party 112 has made an opt-in request. If the listening device receives the voice command "opt-out" or the DTMF tone "2" during the ringing phase of the call, then the listening device, IP 128, or SCP 126 determines that the calling party 112 has made an opt-out request.

If the received input corresponds to an opt-in request, then STEP 216 proceeds to STEP 218. At STEP 218, the SCP 126 saves an indication of the opt-in request in the ringback tone subscriber profile of the called party 114. For example, the SCP 126 sets the ringback tone service state of the calling party 112 to an opt-in state in the ringback tone subscriber profile of the called party 114. The SCP 126 sets the opt-in state in one example by removing any opt-out flags that may be associated with the calling party 112 in the ringback tone subscriber profile of the called party 114. The opt-in request serves to allow subsequent use of specialized ringback tones selected by the called party 114 on calls from the calling party 112 to the called party 114. The SCP 126 in one example receives an indication of the opt-in request from the IP 128 in a Transmission Control Protocol/Internet Protocol ("TCP/IP") message, Lightweight Directory Access Protocol ("LDAP") message, Extensible Markup Language ("XML") message, or the like. After making the opt-in request, the calling party 112 continues to hear the current ringback tone for the remainder of the ringing phase of the call. After the SCP 126 has been alerted of the opt-in request, STEP 218 proceeds back to STEP 206 to wait for the called party 114 to answer the call.

If the received input corresponds to an opt-out request, then STEP 216 proceeds to STEP 220. At STEP 220, the IP 128 and the SCP 126 process the opt-out request. The SCP 126 saves an indication of the opt-out request in the ringback tone subscriber profile of the called party 114. For example, the SCP 126 sets the ringback tone service state of the calling party 112 to an opt-out state in the ringback tone subscriber profile of the called party 114. The SCP 126 sets the opt-out state in one example by associating an opt-out flag with the calling party 112 in the ringback tone subscriber profile of the called party 114. The opt-out request serves to avoid employment of specialized ringback tones selected by the called party 114 on subsequent calls from the calling party 112 to the called party 114. The opt-out request is effective to avoid employment of specialized ringback tones on subsequent calls from the calling party 112 to the called party 114 until the calling party 112 sends an opt-in request. Therefore, the next time the ringback tone service is invoked for a call from the calling party 112 to the called party 114 after the opt-out request, the calling party 112 will not receive a specialized ringback tone.

If the IP 128 is playing a specialized ringback tone to the calling party 112 on the call when the calling party 112 makes the opt-out request, then the IP 128 in one example stops the specialized ringback tone for a remainder of the ringing phase of the call. The SCP 126 receives an indication of the opt-out request in a TCP/IP message, LDAP message, XML message, or the like. After the SCP 126 has been alerted of the opt-out request, STEP 220 proceeds back to STEP 206 to continue monitoring the communication path for more input from the calling party 112 or for the called party 114 to answer the call.

Figure 3:
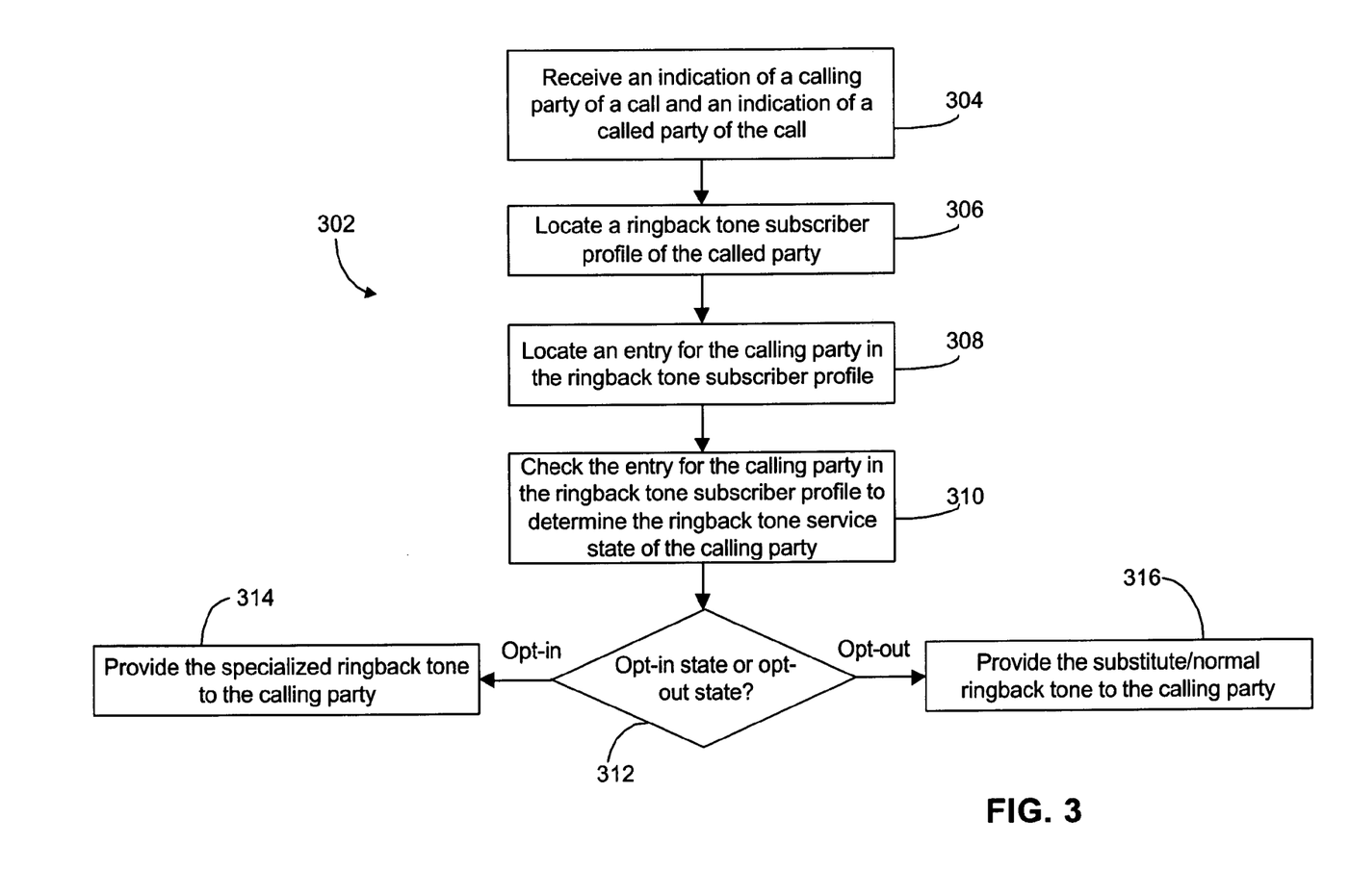
FIG. 3 is a representation of one exemplary logic flow that illustrates a determination of whether to provide a calling party a specialized ringback tone or a substitute tone on a call to a called party.

Referring to FIGS. 1 and 3, an illustrative description of one exemplary operation of the apparatus 100 is presented, for explanatory purposes. Exemplary logic 302 serves to illustrate a determination of whether to provide a calling party (e.g., the calling party 112 or 116) a specialized ringback tone or a substitute tone on a call to a called party (e.g., the called party 114 or 118). An exemplary implementation is described herein using the wireless communication devices (e.g., the calling party 112 and the called party 114). The logic 302 employs one or more steps, for example, STEPS 304, 306, 308, 310, 312, 314, and 316.

To initiate a call to the called communication device 112, the user of the calling communication device 110 dials the telephone number of the called communication device 112 resulting in a call setup message being received at the MSC 106. The MSC 106 processes the call and determines that the call may require a specialized ringback tone. For example, while processing the incoming call from the calling party 112 to the called party 114, the MSC 106 encounters an Advanced Termination trigger and determines from the Trigger Address List parameter to send an Analyzed Information operation message to the SCP 126. The Analyzed Information operation message comprises a WIN signaling message.

At STEP 304, the SCP 126 receives an indication of the calling party 112 of the call and an indication of the called party 114 of the call. For example, the SCP 126 receives the Analyzed Information operation message from the MSC 106 that contains calling party information, called party information, and call characteristic information for the incoming call. The Analyzed Information operation message in one example indicates one or more of: a directory number of the calling party 112, a directory number of the called party 114, the time and date of the incoming call, an identification of the serving mobile switching center, the called party location, or the like.

At STEP 306, the SCP 126 employs the indication of the called party 114 to locate a ringback tone subscriber profile of the called party 114. At STEP 308, the SCP 126 employs the indication of the calling party 112 to locate an entry for the calling party 112 in the ringback tone subscriber profile of the called party 114. At STEP 310, the SCP 126 checks the entry for the calling party 112 in the ringback tone subscriber profile of the called party 114 to determine the ringback tone service state of the calling party 112. For example, the SCP 126 determines whether the calling party 112 is in the opt-in state or the opt-out state for calls to the called party 114.

At STEP 312, the SCP 126 selects a ringback tone treatment for the call based on the ringback tone service state of the calling party 112. If the calling party 112 is in the opt-in state, then STEP 312 proceeds to STEP 314 and the SCP 126 provides the specialized ringback tone to the calling party 112. If the calling party 112 is in the opt-out state, then STEP 312 proceeds to STEP 316 and the SCP 126 provides the substitute tone to the calling party 112.

In one example, the SCP 126 determines that the calling party 112 is in the opt-in state. At STEP 314, the SCP 126 provides the specialized ringback tone to the calling party 314. For example, the SCP 126 routes the incoming call to the IP 128 to play the specialized ringback tone to the calling party 112. The IP 128 plays the specialized ringback tone at the calling party 112 during the ringing phase of the call (i.e., between receipt of the call from the calling party 112 and answer of the call by the called party 114).

In another example, the SCP 126 determines that the calling party 112 is in the opt-out state. The SCP 126 determines, based on the opt-out request from the calling party 112, to provide a substitute tone (e.g., the standard ringback tone) to the calling party 112 in place of the specialized ringback tone on the call from the calling party 112 to the called party 114. At STEP 316, the SCP 126 provides the substitute tone to the calling party 112. For example, the SCP 126 routes the incoming call to the IP 128 to play the standard ringback tone to the calling party 112. Where the IP 128 plays the standard ringback tone to the calling party 112 on the call, the calling party 112 can input an opt-in request during the ringing phase of the call. In another example, the SCP 126 instructs the switch on the call (e.g., the MSC 106) to play the standard ringback tone to the calling party 112 to complete the service for the call. Where the switch on the call plays the standard ringback tone to the calling party 112 during the ringing phase of the call, the calling party 112 can use a post-call interface to later input an opt-in request.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the SCP 126. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

An article in one example comprises one or more computer-readable signal-bearing media; means in the one or more media for receiving an opt-out request from a calling party to avoid employment of a specialized ringback tone on one or more subsequent calls from the calling party to a called party; and means in the one or more media for determining at a ringback tone call controller, based on the opt-out request, to provide a substitute tone to the calling party in place of the specialized ringback tone on the one or more subsequent calls from the calling party to the called party.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
   receiving an opt-out request from a calling party to avoid employment of a specialized ringback tone on one or more subsequent calls from the calling party to a called party, wherein the specialized ringback tone is preselected by the called party to be played to the calling party on a call from the calling party to the called party;
   determining at a ringback tone call controller, based on the opt-out request, to provide a substitute tone to the calling party in place of the specialized ringback tone on the one or more subsequent calls from the calling party to the called party; and
   stopping the specialized ringback tone for a remainder of a ringing phase of the call in response to a voice command determined to be a valid opt-out request by the ringback tone call controller or a ringback tone server if the specialized ringback tone is being played to the calling party on the call when the calling party makes the opt-out request.

2. The method of claim 1, wherein the substitute tone comprises a standard ringback tone.

3. The method of claim 2, further comprising the step of:
   instructing the ringback tone server to play the standard ringback tone to the calling party on the call in place of the specialized ringback tone.

4. The method of claim 2, wherein the one or more subsequent calls comprises a call from the calling party received at a switch, the method further comprising the step of:
   instructing the switch to play the standard ringback tone to the calling party on the call in place of the specialized ringback tone.

5. The method of claim 1, wherein the ringback tone call controller comprises a ringback tone subscriber profile of the called party that stores an indication of the specialized ringback tone preselected by the called party to be played to the calling party on the one or more subsequent calls from the calling party, the method further comprising the step of:
   storing an indication of the opt-out request in an entry for the calling party in the ringback tone subscriber profile of the called party.

6. The method of claim 5, wherein the one or more subsequent calls comprise a call from the calling party to the called party, and wherein the step of determining comprises the steps of:
   accessing the entry for the calling party in the ringback tone subscriber profile; and
   determining that the entry for the calling party in the ringback tone subscriber profile comprises the Indication of the opt-out request for the call;
   the method further comprising the step of:
   providing the substitute tone to the calling party on the call.

7. The method of claim 6, wherein the opt-out request is effective to avoid employment of the specialized ringback tone until the calling party sends an opt-in request, the method further comprising the step of:
   removing, via a post call interface applicable to subsequent calls, the indication of the opt-out request from the entry for the calling party in the ringback tone subscriber profile upon receipt of the opt-in request from the calling party.

8. The method of claim 1, wherein the one or more subsequent calls comprise one or more first subsequent calls, the method further comprising the steps of:
   receiving, via a post call interface applicable to subsequent calls, an opt-in request from the calling party to accept the specialized ringback tone on one or more second subsequent calls from the calling party to the called party; and
   determining, based on the opt-in request, to provide the specialized ringback tone to the calling party on the one or more second subsequent calls from the calling party to the called party.

9. The method of claim 1, wherein the one or more subsequent calls comprises a call from the calling party received at a switch, wherein the step of determining further comprises the steps of:
   receiving, from the switch, an indication of the calling party of the call and an indication of the called party of the call;
   employing the indication of the called party to locate a ringback tone subscriber profile of the called party;
   employing the indication of the calling party to locate an entry for the calling party in the ringback tone subscriber profile; and
   checking the entry for the calling party in the ringback tone subscriber profile to determine whether the entry indicates that the calling party is in an opt-in state or an opt-out state for the call.

10. The method of claim 1, wherein the step of receiving comprises the step of:
    receiving from the calling party the voice command or a Dual-Tone Multi-Frequency (DTMF) tone while playing the specialized ringback tone to the calling party during a ringing phase of a call to the called party, wherein the voice command or DTMF tone comprises the opt out request from the calling party.

11. The method of claim 10, further comprising the steps of:
    stopping the specialized ringback tone for a remainder of the ringing phase of the call; and
    saving an indication of the opt-out request in a ringback tone subscriber profile of the called party to avoid employment of the specialized ringback tone for the one or more subsequent calls from the calling party to the called party.

12. The method of claim 1, wherein the step of receiving comprises the step of:
    receiving the opt-out request at the ringback tone call controller from a post-call interface employed by the calling party;
    the method further comprising the step of:
    saving an indication of the opt-out request in a ringback tone subscriber profile of the called party to avoid employment of the specialized ringback tone for the one or more subsequent calls from the calling party to the called party.

13. The method of claim 1, wherein a ringback tone subscriber profile of the called party stores a ringback tone service state of the calling party, and wherein the ringback tone service state of the calling party indicates an opt-in state before receipt of the opt-out request, the method further comprising the step of:

modifying the ringback tone service state in the ringback tone subscriber profile of the called party from the opt-in state to an opt-out state upon receipt of the opt-out request.

14. The method of claim 1, further comprising the step of:
connecting the calling party with the ringback tone server that plays the specialized ringback tone to the calling party on a call to the called party;
wherein the step of receiving comprises the steps of:
receiving at the ringback tone server the opt-out request from the calling party;
sending an indication of the opt-out request from the ringback tone server to the ringback tone call controller; and
storing at the ringback tone call controller an indication of the opt-out request in a ringback tone subscriber profile of the called party to prevent employment of the specialized ringback tone on the one or more subsequent calls.

15. A method, comprising the steps of:
accessing a ringback tone subscriber profile of a called party to determine which ringback tone to provide to a calling party on a call to the called party, wherein the called party has pre-provisioned a specialized ringback tone to be played to the calling party on the call;
providing the specialized ringback tone to the calling party on the call if the ringback tone subscriber profile indicates that the calling party is in an opt-in state;
providing a standard or default ringback tone to the calling party on the call if the ringback tone subscriber profile indicates that the calling party is in an opt-out state; and
stopping the specialized ringback tone for a remainder of a ringing phase of the call in response to a voice command determined to be a valid opt-out request by the ringback tone call controller or a ringback tone server if the specialized ringback tone is being played to the calling party on the call when the calling party makes the opt-out request.

16. The method of claim 15, wherein the step of providing the specialized ringback tone comprises the step of:
instructing the ringback tone server to play the specialized ringback tone to the calling party on the call if the ringback tone subscriber profile indicates that the calling party is in the opt-in state;
wherein the step of providing the standard or default ringback tone comprises the step of:
instructing the ringback tone server or a switch on the call to play the standard or default ringback tone to the calling party on the call if the ringback tone subscriber profile indicates that the calling party is in the opt-out state.

17. The method of claim 15, further comprising the step of:
receiving an opt-out request from the calling party to avoid employment of the specialized ringback tone on one or more subsequent calls from the calling party to the called party; and
modifying a ringback tone service state associated with the calling party in the ringback tone subscriber profile of the called party from the opt-in state to the opt-out state upon receipt of the opt-out request.

18. The method of claim 17, wherein the opt-out request is effective to avoid employment of the specialized ringback tone until the calling party sends an opt-in request, the method further comprising the step of:
modifying the ringback tone service state associated with the calling party in the ringback tone subscriber profile of the called party from the opt-out state to the opt-in state upon receipt of the opt-in request via a post call interface applicable to subsequent calls.

19. The method of claim 15, wherein the call from the calling party is received at a switch, the method further comprises the steps of:
receiving, from the switch, an indication of the calling party of the call and an Indication of the called party of the call;
employing the indication of the called party to locate the ringback tone subscriber profile of the called party; and
employing the indication of the calling party to locate an entry for the calling party in the ringback tone subscriber profile;
wherein the step of accessing comprises the step of:
checking the entry for the calling party in the ringback tone subscriber profile to determine whether the entry indicates that the calling party is In the opt-In state or the opt-out state for the call.

20. The method of claim 15, wherein the call comprises a second call from the calling party subsequent to a first call from the calling party, the method further comprising the steps of:
receiving an opt-out request from the calling party while playing the specialized ringback tone to the calling party during a ringing phase of the first call to the called party;
stopping the specialized ringback tone for a remainder of the ringing phase of the first call; and
saving an indication of the opt-out request in the ringback tone subscriber profile of the called party to avoid employment of the specialized ringback tone for the second call from the calling party to the called party.

21. The method of claim 15, wherein the call comprises a second call from the calling party subsequent to a first call from the calling party, the method further comprising the steps of:
receiving, via a post call interface applicable to subsequent calls, an opt-in request from the calling party while playing the standard or default ringback tone to the calling party during a ringing phase of the first call to the called party; and
saving an indication of the opt-in request in the ringback tone subscriber profile of the called party to allow employment of the specialized ringback tone for the second call from the calling party to the called party.

22. An apparatus, comprising:
means for receiving an opt-out request from a calling party to avoid employment of a specialized ringback tone on one or more subsequent calls from the calling party to a called party, wherein the specialized ringback tone is preselected by the called party to be played to the calling party on a call from the calling party to the called party;
means for determining at a ringback tone call controller, based on the opt-out request, to provide a substitute tone to the calling party in place of the specialized ringback tone on the one or more subsequent calls from the calling party to the called party; and
means for stopping the specialized ringback tone for a remainder of a ringing phase of the call in response to a voice command determined to be a valid oat-out request if the specialized ringback tone is being played to the calling party on the call when the calling party makes the opt-out request.

23. The method of claim 1, wherein the called party uses a wire-line communication device.

24. The method of claim 1, wherein the called party uses a wireless communication device.

25. The method of claim 1, wherein the voice command "opt-out" and a Dual-Tone Multi-Frequency (DTMF) tone "2" correspond to the opt-out request.

26. The method of claim 7, wherein the voice command "opt-in" and a Dual-Tone Multi-Frequency (DTMF) tone "1" correspond to the opt-in request.

27. The method of claim 1, wherein session Initiation protocol (SIP) signaling is employed in at least a portion of a signaling path to route the call that requires the specialized ringback tone, and wherein the at least a portion of the signaling path where SIP signaling is employed is between the ringback tone server and the ringback tone call controller.

28. The method of claim 1, wherein the ringback tone call controller receives an indication of the opt-out request In a TCP/IP message.

29. The method of claim 1, wherein the ringback tone call controller receives an indication of the opt-out request in a LDAP message.

30. The method of claim 1, wherein the ringback tone call controller receives an indication of the opt-out request in a XML message.

31. The method of claim 1, wherein the calling party sends the opt-out request via an interactive voice response system.

32. The method of claim 1, wherein the calling party sends the opt-out request via a wireless application protocol menu.

33. The method of claim 1, wherein the calling party sends the opt-out request via an Internet.

34. The method of claim 1, wherein the ringback tone server stops the specialized ringback tone in response to the validated voice command.

* * * * *